Dec. 5, 1933.   L. E. ENDSLEY   1,938,099
FRICTION SPRING
Filed May 17, 1932

INVENTOR
Louis E. Endsley,
By Archworth Martin,
Attorney.

Patented Dec. 5, 1933

1,938,099

UNITED STATES PATENT OFFICE 1,938,099

FRICTION SPRING

Louis E. Endsley, Pittsburgh, Pa.

Application May 17, 1932. Serial No. 611,763

2 Claims. (Cl. 267—1)

My invention relates to friction springs for draft gears, or carrying springs for freight cars, of the type wherein two coils are arranged in substantially concentric relation and have cooperating frictional camming surfaces, whereby when the one coil is compressed in the direction of its axis, the other coil will be compressed longitudinally and expanded radially.

Heretofore it has been common practice to so arrange the springs that the load-carrying coil will be fully compressed before the turns of the friction coil are fully compressed, or to cause the turns of both coils to be simultaneously compressed.

In these older types of friction springs, the inner coil is the principal load-carrying coil. In other words, it is subjected to greater stresses and more severe distortion than the outer coil, particularly on lighter impacts or impacts which do not fully compress the springs. The result is that the inner spring is very short-lived compared to the outer coil and requires frequent renewal.

One object of my invention is to provide a structure wherein the stresses, and particularly those which do not fully compress the coils, are distributed more evenly to the coils, with consequent increase in life of the springs, and fewer repairs or replacements.

Another object of my invention is to provide a spring structure of such form that impacts of greater force are required to move the inner spring "solid" than in previous structures of similar size or weight.

Another object of my invention is to provide a spring structure wherein the width of each turn of the outer coil is greater in directions axially of the coil than the width of the inner turns, whereby the turns of the outer coil are brought successively into abutting engagement in advance of the adjacent turns of the inner coil.

Another object of my invention is to provide radially-extending frictional contacting surfaces on the abutting surfaces of the outer turns.

Another object of my invention is to provide a spring structure wherein the end turns of the outer coil have a greater range of slip, to produce increased friction against the turns of the inner coil and the end seats of the spring than in older types of draft gears.

Figure 3:
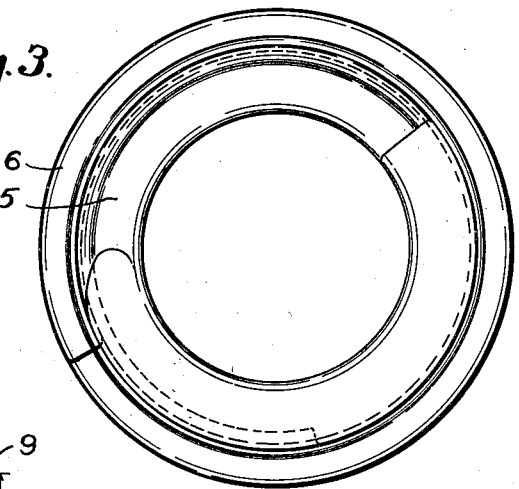
Figure 1:
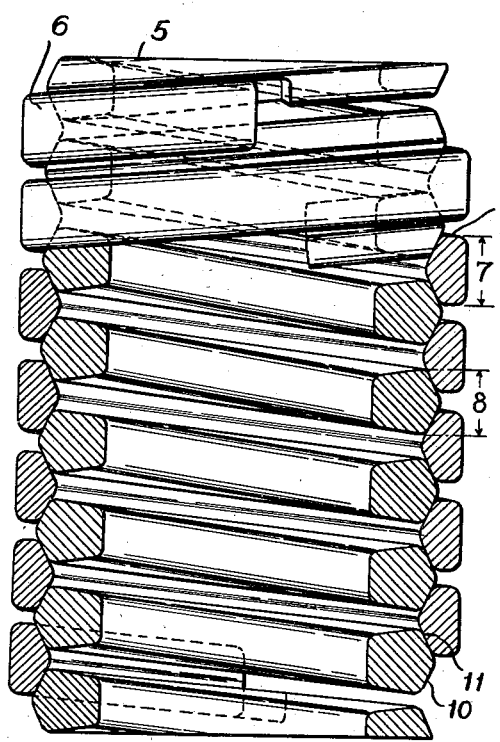
Figure 2:
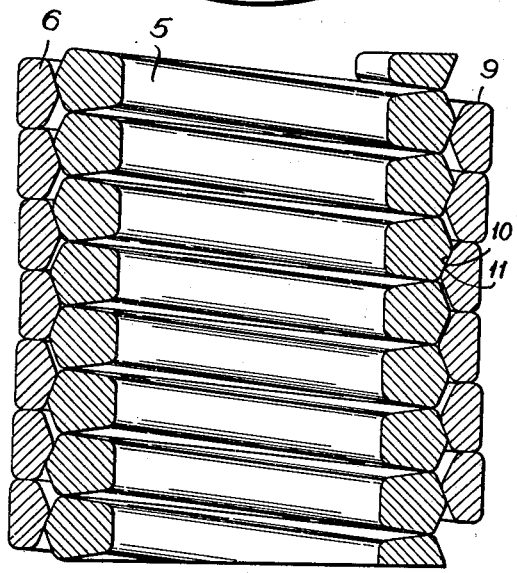

One form which my invention may take is shown in the accompanying drawing wherein Figure 1 is a longitudinal sectional view of the spring structure in expanded condition; Fig. 2 is a similar view showing the coils compressed, and Fig. 3 is an end view of the structure.

Only so much of the structure is shown as is necessary to an understanding of my invention. It will be understood that the coils may be placed within a casing or housing of any well-known type, with suitable seating blocks for the ends of the springs.

The inner or load-carrying coil is represented by the numeral 5 and the outer or friction coil by the numeral 6. The width of the outer turns as indicated by the arrows 7, is greater than the greatest axial dimension of the inner turns.

For example, the dimension at 7 may be .82 inch, while the width of the inner coil, as indicated at 8, may be .78 inch. These dimensions may, of course, be varied, it being desirable however to have the outer turns of greater width than the inner turns. The outer turns have their abutting surfaces 9 widened in radial directions to provide a wide contacting area when the outer coils are compressed.

The inclined or camming surfaces 10 and 11 on the coils 5 and 6, respectively, result in radial expansion of the outer coil when the inner spring is compressed, and as the turns of the outer coil are successively brought into abutting or solid engagement with one another, the turns of the engagement with one another, the turns of the inner coil are successively compressed. When the surfaces 9 of the outer coil are brought into abutting engagement, friction is developed on such surfaces 9 through the radial and rotative movements of the turns of the coil 6, and particularly in the end turns thereof.

It will be seen that by reason of the greater width of the outer spring turns, they will be brought into solid or abutting engagement in advance of the inner turns, with the result that the inner spring is relieved of a portion of the compression strains which would be imposed thereon if the turns of the inner spring were compressed into contact with one another in advance of the turns of the outer spring, or if the said inner turns were fully compressed simultaneously with the complete compression of the outer spring.

Compressing of the inner spring also results in radial expansion of the outer spring, with resultant rotative movement of some of the outer turns, particularly near the ends of the outer spring. These end turns, of course, seat against blocks or other surfaces.

Although the thrust or compression forces are less between the surfaces 10 and 11 in the end turns of the coils than at the middle turns, the end turns have greater rotative movement, and the friction on the surfaces 9, 10 and 11 is thereby increased. These friction surfaces not only increase the cushioning or shock-absorbing capacity of the springs, but cause dampening of the recoil upon release of the springs. The inner coil cannot become fully released until almost all of the pressure is removed from the edges 9 of the outer coil, thus there will be considerable frictional resistance to release movement of the inner coil.

I claim as my invention:—

1. Friction spring structure comprising normally-expanded concentric load-carrying and friction coils having cooperating frictional surfaces inclined with respect to the axis of the coils, the axially-extending width of the turns in the friction coil being greater than the width of the turns of the load-carrying coil.

2. Friction spring structure comprising normally-expanded concentric coils having cooperating frictional surfaces inclined with respect to the axis of the coils, the axially-extending width of the turns in the outer coil being greater than the width of the inner turns, and the edges of the outer turns being flattened to provide wide contacting surfaces between said outer turns.

LOUIS E. ENDSLEY.